US006569397B1

(12) United States Patent
Yadav et al.

(10) Patent No.: US 6,569,397 B1
(45) Date of Patent: May 27, 2003

(54) VERY HIGH PURITY FINE POWDERS AND METHODS TO PRODUCE SUCH POWDERS

(75) Inventors: Tapesh Yadav, 2620 Trade Center Ave., Longmont, CO (US) 80503; Karl Pfaffenbach, Boulder, CO (US)

(73) Assignee: Tapesh Yadav, Longmont, CO (US)

( * ) Notice: Subject to any disclaimer, the term of this patent is extended or adjusted under 35 U.S.C. 154(b) by 0 days.

(21) Appl. No.: 09/638,977

(22) Filed: Aug. 15, 2000

Related U.S. Application Data (60) Provisional application No. 60/182,692, filed on Feb. 15, 2000.

(51) Int. Cl.⁷ ................................................ C01B 31/36
(52) U.S. Cl. ...................................................... 423/345
(58) Field of Search ................................ 423/440, 439, 423/345

(56) References Cited

U.S. PATENT DOCUMENTS

| | | | |
|---|---|---|---|
| 4,164,553 A | 8/1979 | Perugini et al. | |
| 5,217,747 A | 6/1993 | Tsantrizos et al. | |
| 5,589,116 A | * 12/1996 | Kojima et al. | ................. 264/65 |
| 5,749,937 A | 5/1998 | Detering et al. | |
| 5,851,507 A | 12/1998 | Pirzada et al. | |
| 5,863,325 A | * 1/1999 | Kanemoto et al. | .......... 119/105 |
| 6,214,309 B1 | * 4/2001 | Shaw et al. | ................. 423/345 |

* cited by examiner

*Primary Examiner*—Stuart L. Hendrickson
(74) *Attorney, Agent, or Firm*—Stuart T. Langley; Hogan & Hartson LLP (57) ABSTRACT

A method of producing very high purity fine powders of oxides, carbides, nitrides, borides, chalcogenides, metals, and alloys. The purity of powders produced by the method exceeds 99.9%, preferably 99.999%, more preferably 99.99999%, and most preferably 99.9999999%. Fine powders produced are of size less than 100 microns, preferably less than 10 micron, more preferably less than 1 micron, and most preferably less than 100 nanometers. Methods for producing such powders in high volume, low-cost, and reproducible quality are also outlined. The very high purity, fine powders are envisioned to be useful in various applications such as biomedical, sensor, electronic, electrical, photonic, thermal, piezo, magnetic, catalytic and electrochemical products.

4 Claims, 3 Drawing Sheets

VERY HIGH PURITY FINE POWDERS AND METHODS TO PRODUCE SUCH POWDERS

RELATED APPLICATIONS

The present invention claims priority to copending U.S. provisional patent application Ser. No. 60/182,692 entitled "Very High Purity Fine Powders and Methods to Produce Such Powders" filed Feb. 15, 2000, the specification of which is incorporated herein by reference.

BACKGROUND OF THE INVENTION

1. Field of the Invention

The present invention relates, in general, to high purity powders, and, more particularly, to high purity fine powders and methods to produce high purity fine powders.

2. Relevant Background

Powders are used in numerous applications. They are the building blocks of electronic, telecommunication, electrical, magnetic, structural, optical, biomedical, chemical, thermal, and consumer goods. On-going market demand for smaller, faster, superior and more portable products has resulted in miniaturization of numerous devices. This, in turn, has demanded miniaturization of the building blocks, i.e. the powders. Sub-micron and nanoscale (or nanosize, ultrafine) powders, with a size 10 to 100 times smaller than conventional micron size powders, enable quality improvement and differentiation of product characteristics at scales currently unachievable by commercially available micron-sized powders.

Nanopowders in particular and sub-micron powders in general are a novel family of materials whose distinguishing feature is that their domain size is so small that size confinement effects become a significant determinant of the materials' performance. Such confinement effects can, therefore, lead to a wide range of commercially important properties. Nanopowders, therefore, represent an extraordinary opportunity for design, development and commercialization of a wide range of devices and products for various applications. Furthermore, since they represent a whole new family of material precursors where conventional coarse-grain physiochemical mechanisms are not applicable, these materials offer unique combinations of properties that can enable novel and multifunctional components of unmatched performance. Bickmore et al. in U.S. Pat. No. 5,984,997, which along with the references contained therein are hereby incorporated by reference in full, teach some applications of sub-micron and nanoscale powders.

Higher purity materials are needed in electronic applications. For example, silicon is now routinely purified to levels greater than 99.99999% for electronic applications. It is expected that the purity requirements for electronic applications will increase even further. Not only silicon, but other elements from the periodic table and other compounds (metal, semimetal, inorganic or organic) are and will be desired in greater and greater purity. Crystals, bulk materials, fibers, coatings and films are all desired in high purity. Impurities cause failures or defects in electronic and other applications. Higher purity chemicals and materials offer a means of greater product reliability and performance. They also offer means to extend the life of products. For example, batteries prepared from high purity materials offer longer life and superior performance. Existing applications that use commercially available low purity chemicals and materials may all benefit from higher purity chemicals and materials. Since many chemicals and materials are used in the form of powders at some stage, high purity powders are needed and are expected to be needed in the future.

Commonly used high purity powder production techniques are based on starting with commercial grade impure powders and then applying purification techniques to reduce impurities. Some illustrations include leaching, extraction and precipitation, melting, sublimation of volatile impurities, decomposition, chemical reaction, dissolution and crystallization, and electrochemical techniques. These methods are expensive, slow, low volume, and difficult when purities greater than 99.99% are desired. This is one reason why powders with purity greater than 99.9% often enjoy price premiums that are 100 fold higher than readily available low purity powders (95 to 98%).

Padhi and Pillai (U.S. Pat. No. 5,955,052) teach a process which provides high purity lithiated manganese oxide powders, and is hereby incorporated by reference. Their process is a chemical ion exchange reduction method. They do not teach how to reach product purities greater than 99.9%, and their process is expected to be expensive.

Schloh (U.S. Pat. No. 5,711,783) teaches a process for preparing high purity metal powder by reacting one or more volatile alkoxide compounds with a reducing gas, and is hereby incorporated by reference. The process yields a product with very low metal impurities (in the parts-per-million (ppm) range), but with carbon and oxygen impurities. The process is not suitable for production of oxides, carbides, and many other compounds.

Kambara (U.S. Pat. No. 5,722,034, which is hereby incorporated by reference) teaches a method of manufacturing a high-purity refractory metal or alloy using a novel electron beam refining method. This method starts with powders or lumps, but ends up with a sintered material. The method is reported to yield 99.999% pure metal and alloys. This method is anticipated to lead to higher costs. The teachings do not suggest methods for producing high purity inorganics (e.g., oxides). Furthermore, the teachings do not suggest ways to produce high purity powders.

Axelbaum and DuFaux (U.S. Pat. No. 5,498,446, which is hereby incorporated by reference) teach a method and apparatus for reacting sodium vapor with gaseous chlorides in a flame to produce nanoscale particles of un-oxidized metals, composites and ceramics. The invention relates to a development in the production of sub-micron particles and, more particularly, to a development in the flame synthesis of un-agglomerated, nanometer-sized particles of characteristically high purity. The un-oxidized high purity is achieved because of the coating with sodium chloride formed during the flame process. The sodium vapor process is difficult to operate, increases safety concerns, is expensive and is difficult to scale up. It is expected that the powders produced have sodium and chloride contamination arising from the synthesis mechanism used. The teachings are limited to producing particles that are compatible with sodium flame chemistry. Furthermore, the teachings do not specify methods to produce complex materials such as multimetal oxides, carbides, nitrides, borides, and the like.

Krstic (U.S. Pat. No. 5,338,523, and which is hereby incorporated by reference) teaches a process for the production of high purity, high surface area, sub-micron size transition metal carbides and borides. The Krstic method comprises mixing transition metal oxide with carbon in an amount sufficient to form the corresponding carbide or boride. The reactants are heated at a temperature of higher than 1000° C. under a small pressure of non-reacting gas and then holding the temperature whilst applying simultaneously sub-atmospheric pressure and agitation until the reaction is complete. Krstic teachings suggest how lower carbon impurities can be achieved over the state of the art, but do not suggest how purities in excess of 99.9% can be achieved. The process is also limited in its economic attractiveness.

DEFINITIONS

Fine powders, as the term used herein, are powders that simultaneously satisfy the following:

1. particles with mean size less than 100 microns, preferably less than 10 microns, and
2. particles with aspect ratio between $10^0$ and $10^6$.

Submicron powders, as the term used herein, are fine powders that simultaneously satisfy the following:

1. particles with mean size less than 1 micron, and
2. particles with aspect ratio between 100 and $10^6$.

Nanopowders (or nanosize or nanoscale powders), as the term used herein, are fine powders that simultaneously satisfy the following:

1. particles with mean size less than 250 nanometers, preferably less than 100 nanometers, and
2. particles with aspect ratio between 100 and $10^6$.

Pure powders, as the term used herein, are powders that have composition purity of at least 99.9%, preferably 99.99% by metal basis.

Powder, as the term used herein encompasses oxides, carbides, nitrides, chalcogenides, metals, alloys, and combinations thereof. The term includes particles that are hollow, dense, porous, semi-porous, coated, uncoated, layered, laminated, simple, complex, dendritic, inorganic, organic, elemental, non-elemental, composite, doped, undoped, spherical, non-spherical, surface functionalized, surface non-functionalized, stoichiometric, and non-stoichiometric form or substance.

SUMMARY OF THE INVENTION

Briefly stated, the present invention involves the production of high purity fine powders of oxides, carbides, nitrides, borides, chalcogenides, metals, and alloys. The purity of powders described exceed 99.9%, preferably 99.999%, more preferably 99.99999%, and most preferably 99.9999999%. Preferably, precursors used to produce the powders have a purity of at least that which is desired for the final product. Fine powders discussed are of size less than 100 microns, preferably less than 10 micron, more preferably less than 1 micron, and most preferably less than 100 nanometers. Methods for producing such powders in high volume, low-cost, and reproducible quality are also outlined.

DETAILED DESCRIPTION OF THE PREFERRED EMBODIMENTS

This invention is directed to very high purity fine powders of oxides, carbides, nitrides, borides, chalcogenides, metals, and alloys. The scope of the teachings includes purities that exceed 99.9%, 99.99%, preferably 99.999%, more preferably 99.99999%, and most preferably 99.9999999%. Fine powders discussed are of size less than 100 microns, preferably less than 10 micron, more preferably less than 1 micron, and most preferably less than 100 nanometers. Methods for producing such powders in high volume, low-cost, and reproducible quality are also outlined.

Figure 1:
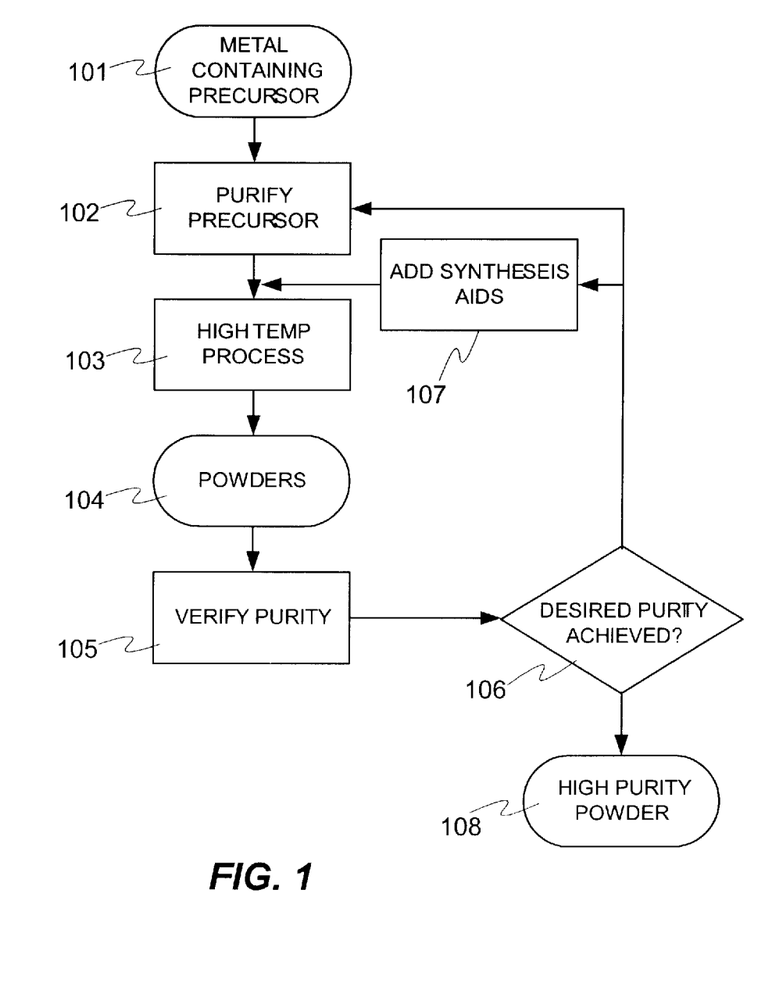
FIG. 1 shows an exemplary overall approach for production high purity powders in accordance with the present invention.

FIG. 1 shows an exemplary overall approach for production high purity powders in accordance with the present invention. This method can be used to produce powders that are coarse and pure, but is particularly useful for sub-micron and nanoscale powders. The process shown in FIG. 1 begins at 101 with a metal containing precursor (for example but not limited to, emulsion, fluid, particle containing liquid slurry, or water soluble salt).

A key feature of this invention is preparing high purity fluid precursors for powders of desired composition in step 102. Numerous methods are available to purify fluids. To illustrate but not limit, distillation, membranes, electrochemical cells, ion exchange, and chromatography are a few unit operations that can achieve high purity. Techniques are now commercially available that can achieve parts per billion purity levels. These techniques and new discoveries are enabling the production of fluids that have parts per trillion purities.

In a preferred embodiment for the present invention, environmentally benign, safe, readily available, high metal loading, lower cost fluid precursors are preferred. The precursor may be a gas, single phase liquid, multiphase liquid, a melt, fluid mixtures and combinations thereof. Illustration of precursors includes but does not limit to metal acetates, metal carboxylates, metal ethanoates, metal alkoxides, metal octoates, metal chelates, metallo-organic compounds, metal halides, metal azides, metal nitrates, metal sulfates, metal hydroxides, metal salts soluble in organics or water, and metal containing emulsions. Multiple metal precursors may be mixed if complex powders are desired. To illustrate but not limit, barium precursor and titanium precursor may be mixed to prepare high purity barium titanate powders; alternatively, yttrium precursor, barium precursor, and copper precursor may be mixed in correct proportion to yield high purity YBCO powder for superconducting applications. In all cases, it is necessary to use precursors that are more than 99.9% pure to begin with if the ultimate powder purity desired is 99.9%. If purities greater than x % is desired, one or more precursors that are mixed and used must all be equal to or greater than x % pure to practice the teachings herein.

When the objective is to prepare an oxide, a preferred embodiment of this invention is to use a precursor in which the oxygen-to-carbon elemental ratio in the precursor molecule is high. Alternatively or in combination, a reactive fluid may be added with the precursor to the reaction zone which provides excess oxygen. Some illustrative examples include but are not limited to oxygen gas and air.

When the objective is to prepare a carbide, a preferred embodiment of this invention is to use a precursor with an oxygen-to-carbon elemental ratio in the precursor molecule less than 0.1 and more preferably less than 1.0, and most preferably less than 2.0. Alternatively or in combination, a reactive fluid may be added with the precursor to the reaction zone which provides excess carbon or reduces excess oxygen. Some illustrative examples include but are not limited to methane, ethylene, acetylene, ethane, natural gas, benzene, naphtha, and hydrogen.

If the objective is to prepare a nitride, a preferred embodiment of this invention is to use a precursor with an oxygento-nitrogen elemental ratio in the precursor molecule less than 0.1 and more preferably less than 1.0, and most preferably less than 2.0. Alternatively or in combination, a reactive fluid may be added with the precursor to the reaction zone which provides excess nitrogen or reduces excess oxygen. Some illustrative examples include but are not limited to amines, ammonia, hydrazine, nitrogen, and hydrogen.

When the objective is to prepare a boride, a preferred embodiment of this invention is to use a precursor with an oxygen-to-boron elemental ratio in the precursor molecule less than 0.1 and more preferably less than 1.0, and most preferably less than 1.5. Alternatively or in combination, a reactive fluid may be added with the precursor to the reaction zone which provides excess boron or reduces excess oxygen. Some illustrative examples include, but are not limited to, boranes, boron, and hydrogen.

When the objective is to prepare a carbonitride, a preferred embodiment of this invention is to use a precursor with (a) oxygen-to-carbon elemental ratio in the precursor molecule less than 0.1 and more preferably less than 1.0, and most preferably less than 2.0, and (b) oxygen-to-nitrogen elemental ratio in the precursor molecule less than 0.1 and more preferably less than 1.0, and most preferably less than 2.0. Alternatively or in combination, a reactive fluid may be added with the precursor to the reaction zone which provides excess nitrogen and carbon, or reduces excess oxygen. Some illustrative examples include, but are not limited to methane, ethylene, acetylene, ethane, natural gas, benzene, naphtha, amines, ammonia, hydrazine, nitrogen, and hydrogen.

While the above paragraphs specifically teach methods to prepare high purity powders of oxides, carbides, nitrides, borides, and carbonitrides, the teachings may be readily extended in analogous manner to other compositions. While variations of the teachings herein that allow impurities that may be easily removed from the powder by post-processing may be permitted and practiced, it is recommended that impurities be avoided to begin with. While it is preferred to use high temperature processing, a moderate temperature processing, or a low/cryogenic temperature processing may also be employed to produce high purity fine powders.

Once the pure precursor is available, it is processed at high temperatures to form the product powder. Products such as powders produced from these precursors are pure.

It is important to ensure that the method of producing the product and the environment in which these products are produced are pure and compatible with the chemistry involved. To illustrate but not limit, to ensure high purity in the final product, the material of construction for precursor pumping and pipes and the wall of the reactor should be inert to the precursor, the reaction intermediates, and the final products. Similarly, any oxidants or diluents or secondary aids used to transform the precursor into the product should be of purity equal to or higher than that desired in the final product. In the preferred embodiment inerts such as argon, helium, and xenon are used wherever possible to shield the powders from contacting impurity generating environments. Furthermore, it is preferred if oxidants, diluents, inerts, or secondary aids are used they are purified to concentrations greater than 99.9%. To reduce costs, these gases may be recycled or mass/heat integrated or used to prepare the pure gas stream desired by the process.

The high temperature processing is conducted at step 103 at temperatures greater than 1000° C., preferably greater than 2000° C., more preferably greater than 3000° C., and most preferably greater than 4000° C. Such temperatures may be achieved by any method such as, but not limited to, plasma processes, combustion, pyrolysis, and electrical arcing in an appropriate reactor. The plasma may provide reaction gases or just provide a clean source of heat. The feed precursors may be injected axially or radially or tangentially or at any angle to the high temperature region. The precursor may be pre-mixed or diffusionally mixed with other reactants. The feed may be laminar, parabolic, turbulent, pulsating, sheared, cyclonic, or any other flow pattern. One may inject one or more precursors from one or more ports in the reactor. The feed spray system may yield a feed pattern that envelops the heat source or alternatively, the heat sources may envelop the feed or alternatively, various combinations of this may be employed. A preferred embodiment is to atomize and spray the feed in a manner that enhances heat transfer efficiency, mass transfer efficiency, momentum transfer efficiency, and reaction efficiency. The reactor shape may be cylindrical, spherical, conical, or any other shape. Method and equipment such as those taught in U.S. Pat. Nos. 5,788,738, 5,851,507, and 5,984,997 (and which are herewith incorporated by reference) are illustrations of various ways the teachings herein can be practiced.

In the preferred embodiment, the high temperature processing method has instrumentation that can assist quality control. Furthermore it is preferred that the process is operated to produce fine powders 104, preferably submicron powders, and most preferably nanopowders. The gaseous products from the process may be monitored for composition, temperature and other variables to ensure quality (e.g., purity) at 105. The gaseous products may be recycled at step 107 or used as a valuable raw material when high purity powders 108 have been formed as determined at step 106 in an integrated manufacturing operation.

Once the product fine powders 108 have been formed, it is preferred that they be quenched to lower temperatures to prevent agglomeration or grain growth such as, but not limited to, methods taught in the U.S. Pat. No. 5,788,738. It is preferred that methods be employed that can prevent deposition of the powders on the conveying walls. These methods may include electrostatic techniques, blanketing with gases, higher flow rates, mechanical means, chemical means, electrochemical means, and/or sonication/vibration of the walls.

The product fine powders may be collected by any method. Some illustrative approaches without limiting the scope of this invention are bag filtration, electrostatic separation, membrane filtration, cyclones, impact filtration, centrifugation, hydrocyclones, thermophoresis, magnetic separation, and combinations thereof.

Figure 2:
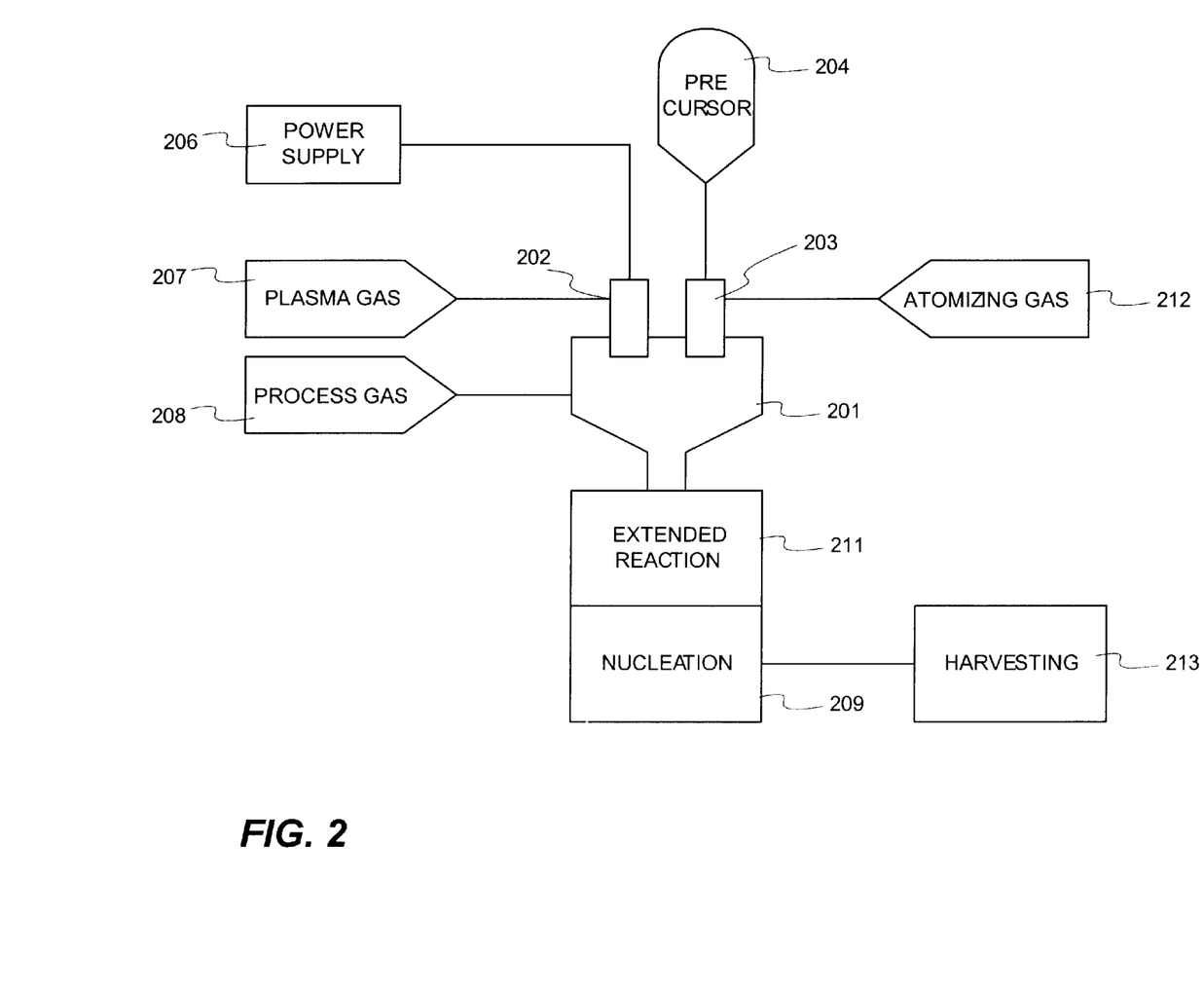
FIG. 2 shows a schematic flow diagram of a thermal process for the continuous synthesis of nanoscale powders in accordance with the present invention.

FIG. 2 shows a schematic flow diagram of a thermal process for the synthesis of nanoscale powders as applied to precursors such as metal containing emulsions, fluid, or water soluble salt. Although a single precursor storage tank 204 is shown in FIG. 2, it should be understood that multiple precursor tanks may be provided and used with or without premixing mechanisms (not shown) to premix multiple precursors before feeding into reactor 201. A feed stream of a precursor material is atomized in mixing apparatus 203. The precursor storage tank 204 may alternatively be implemented by suspending the precursor in a gas, preferably in a continuous operation, using fluidized beds, spouting beds, hoppers, or combinations thereof, as best suited to the nature of the precursor. The resulting suspension is advantageously preheated in a heat exchanger (not shown) preferably with the exhaust heat and then is fed into a thermal reactor 201 where the atomized precursors are partially or, preferably, completely transformed into vapor form. The source of thermal energy in the preferred embodiments is plasma generator 202 powered by power supply 206. Plasma gas 207, which may be inert or reactive, is supplied to plasma generator 202. Alternatively, the source of thermal energy may be internal energy, heat of reaction, conductive, convective, radiative, inductive, microwave, electromagnetic, direct or pulsed electric arc, nuclear, or combinations thereof, so long as sufficient to cause the rapid vaporization of the powder suspension being processed. Optionally, in order to prevent contamination of the vapor stream caused by partial sublimation or vaporization, the walls of reactor 201 may be pre-coated with the same material being processed.

The vapor next enters an extended reaction zone 211 of the thermal reactor 201 that provides additional residence time, as needed to complete the processing of the feed material and to provide additional reaction and forming time for the vapor (if necessary). As the stream leaves the reactor 201, it passes through a zone 209 where the thermokinetic conditions favor the nucleation of solid powders from the vaporized precursor. These conditions are determined by calculating the supersaturation ratio and critical cluster size required to initiate nucleation. Rapid quenching leads to high supersaturation which gives rise to homogeneous nucleation. The zones 201, 209, and 211 may be combined and integrated in any manner to enhance material, energy, momentum, and/or reaction efficiency.

As soon as the vapor has begun nucleation, the process stream is quenched in heat removal apparatus within nucleation zone 209 comprising, for example, a converging-diverging nozzle-driven adiabatic expansion chamber (not shown) at rates at least exceeding $10^3$ K/sec, preferably greater than $10^6$ K/sec, or as high as possible. A cooling medium (not shown) may be utilized for the converging-diverging nozzle to prevent contamination of the product and damage to the expansion chamber. Rapid quenching ensures that the powder produced is homogeneous, its size is uniform and the mean powder size remains in submicron scale.

The quenched gas stream is filtered in appropriate separation equipment in harvesting region 213 to remove the high purity submicron powder product 108 from the gas stream. As well understood in the art, the filtration can be accomplished by single stage or multistage impingement filters, electrostatic filters, screen filters, fabric filters, cyclones, scrubbers, magnetic filters, or combinations thereof. The filtered nanopowder product is then harvested from the filter either in batch mode or continuously using screw conveyors or gas-phase solid transport. The product stream is then conveyed to powder processing or packaging unit operations (not shown in the drawings).

Figure 3:
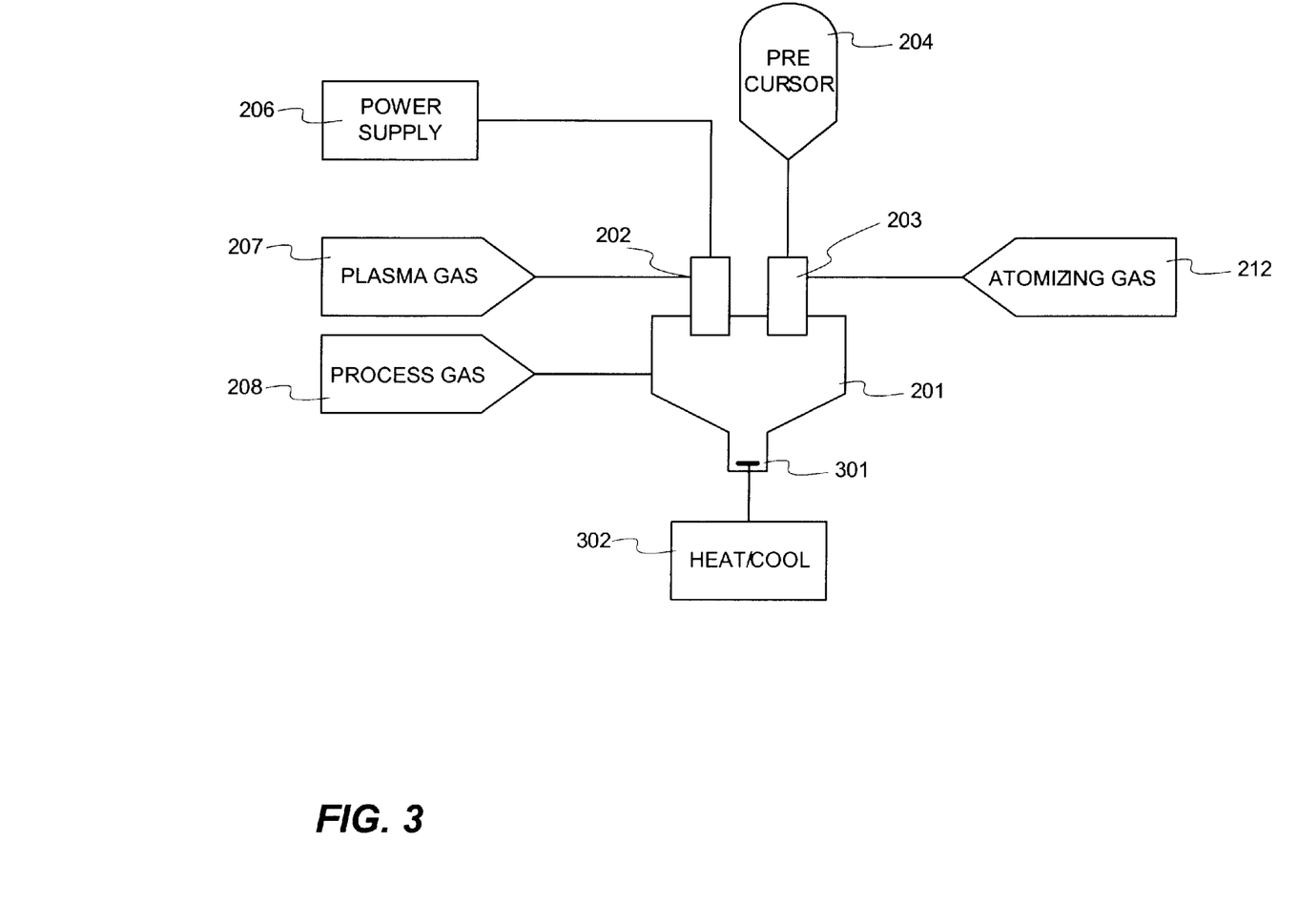
FIG. 3 shows a schematic flow diagram of an alternative thermal process for the continuous synthesis of nanoscale powders.

In an alternative process shown in FIG. 3, the product fine powders instead of being harvested, may alternatively be deposited directly on a substrate to form a coating or film or near net shape structural part. In this embodiment, the fluid precursor is thermally heated to high temperatures to yield a hot vapor. A substrate with an exposed surface to be coated is provided within or in communication with reaction chamber 201 on, for example, a thermally controlled substrate holder 301. The hot vapor is then contacted with a substrate surface that needs to be coated. The hot vapor may be cooled or quenched before the deposition step to provide a stream that has fine liquid droplets or hot particulate matter. The substrate may be cooled or heated using a substrate thermal control 302 to affect the quality of the coating.

The deposition approach in accordance with the present invention is different from thermal spray technology currently in use in many ways such as but not limited to the following ways: (a) the feed is solid micron sized powder in thermal spray processes, in contrast, in this teaching the feed is a fluid precursor; (b) the thermal spray process is considered to yield a powder with molten surface which then sticks to the substrate, in contrast, in this embodiment of the present invention, as the hot vapor cools it is anticipated to yield a molten droplet or soft particulate that forms the coating. The advantage of forming coating or film with the teachings herein is the fine to nanoscale microstructure of the resultant coating or film. Furthermore, it is contemplated that the present invention will yield additional benefits in the ability to easily transport fluids within the process, the ability to form high purity coatings, and the ability to form wide ranges of compositions (oxides, carbides, nitrides, borides, multimetal compositions, composites, etc.) from a limited collection of precursors through mixing and other methods as taught herein.

A coating, film, or component may also be prepared by dispersing the high purity nanopowder and then applying various known methods such as but not limited to electrophoretic deposition, magnetophorectic deposition, spin coating, dip coating, spraying, brushing, screen printing, ink-jet printing, toner printing, and sintering. The nanopowders may be thermally treated or reacted to enhance electrical, optical, photonic, catalytic, thermal, magnetic, structural, electronic, emission, processing or forming properties before such a step.

EXAMPLE 1

Magnesium Oxide

Magnesium acetate was dissolved in high purity water and pumped as a liquid into a plasma reactor. To ensure complete oxidation, pure oxygen was fed into the process. The core temperature of the plasma was greater than 6000° C., while the outer edge temperature was estimated to be greater than 3000° C. The plasma was produced using a DC arc and argon as the plasma gas. The precursor completely vaporized when it interacted with the plasma. The metal vapor oxidized completely. The vapor was slightly cooled to encourage the formation of nanopowder. The nanopowder containing stream was quenched in a converging diverging nozzle (to >$10^3$° C./sec) in flowing oxygen. The powder was harvested using membrane bags and a venturi cyclone fed with compressed air for suction effect. The collected powder was high purity magnesium oxide (MgO) with surface area greater than 100 $m^2$/gm and mean size less than 10 nm. Over a two hour run, over 100 grams of powder were harvested. This example illustrated that fine powders, more specifically nanopowders of simple oxides can be manufactured.

EXAMPLE 2

Magnesium Oxide

In another run, magnesium acetate (Reagent Grade 1271R, Shepherd Chemical Company, Cincinnati, Ohio, USA) was dissolved in high purity water and pumped as a liquid into a plasma reactor. The feed had the following impurities on metal basis (K: 35 ppm, Na: 203 ppm, Fe: 88 ppm, Ca: 27 ppm, Ba: <9 ppm, Mn: 53 ppm, Sr: <9 ppm). To ensure complete oxidation, pure oxygen was fed into the process at a faster rate than in Example 1. The core temperature of the plasma was greater than 6000° C., while the outer edge temperature was estimated to be greater than 3000° C. The plasma was produced using a DC arc and argon as the plasma gas. The precursor completely vaporized when it interacted with the plasma. The vapor oxidized completely. The vapor was slightly cooled to encourage the formation of nanopowder. The nanopowder containing stream was quenched in a converging diverging nozzle (to <$10^3$° C./sec) in flowing oxygen. The powder was harvested using membrane bags and a venturi cyclone fed with compressed air for suction effect. The collected powder was high purity magnesium oxide (MgO) with surface area greater than 50 m$^2$/gm and mean size less than 20 nm.

The purity of the fine powder was determined using direct current plasma. The impurities in the fine powder produced were as follows on metal basis (K: 38 ppm, Na: 189 ppm, Fe: 89 ppm, Ca: <10 ppm, Ba: <10 ppm, Mn: 41 ppm, Sr: <10 ppm). In other words, the fine powder produced was over 99.9% pure on metal basis. Given that the product powder was statistically as pure as the feed precursor, this example illustrated that fine powders, and more specifically nanopowders, of high purity oxides can be manufactured from high purity fluids. Such high purity oxides are needed in structural, electronic, photonic, telecom, catalytic, thermal, electrochemical, biomedical, chemical, sensor, optic, electromagnetic, instrumentation, sputtering and energy products.

EXAMPLE 3

Indium Tin Oxide

Indium octoate and tin octoate were mixed in a specified ratio by metal basis. Indium-tin-oxide (ITO) powders with grain size less than 20 nm were produced using the process of Example 1. This example illustrated that fine powders, and more specifically nanopowders, of high purity complex multimetal oxides can be manufactured from fluids. Such high purity multimetal oxides are desired in numerous applications such as, but not limited to, coatings for EMI shielding, electronic, electromagnetic, device, thermal, catalytic, photonic, optical, electrochemical, chemical, sensor, other films/coatings, instrumentation, sputtering and biomedical applications.

EXAMPLE 4

Nickel

Nickel octoate in mineral spirits was pumped as a liquid into the plasma reactor with pure oxygen as in Example 1. Nitrogen gas was added at the entrance and exit to the nozzle as the quenching gas. The collected powder was primarily metallic nickel based on X-ray diffraction analysis and had a surface area of 9 to 24 m$^2$/g and mean size of 30 to 75 nm. The largest particles observed were less than 1 micron. This example presented an unusual result, i.e., that plasma processing can yield a metal powder even when oxygen is present with an organic precursor. Normally, combustion of metal containing organics with oxygen yields metal oxides. This example illustrated that metal powders can be synthesized from metal containing organics in the presence of oxygen when processed at high enough temperatures, i.e. greater than 2000° C., preferably greater than 3000° C., and most preferably greater than 4000° C. This example also illustrated that fine powders, and more specifically nanopowders, of metals can be manufactured. Fine submicron and nanoscale nickel powders are needed for battery, capacitor and other passive electronic component electrodes, electromagnetic shielding and other applications. Additional applications of high purity metal fine powders include, but are not limited to, structural, electronic, electromagnetic, device, thermal, catalytic, photonic, optical, electrochemical, chemical, films/coatings, sensor, instrumentation, sputtering and biomedical applications.

The composition of the powder produced can be varied by controlling the secondary feed gas added. For example, small concentrations of oxygen can yield a non-stoichiometric oxide. Additionally, if methane or ammonia are added, the product powder is of non-stoichiometric or stoichiometric oxycarbide, oxynitride, carbide, nitride, and carbonitride composition.

EXAMPLE 5

Carbon-doped Silicon Carbide

Octa-methyl-cyclo-tetra-siloxane was pumped into the plasma reactor with argon as in Example 1. Nitrogen gas was added at the entrance and exit to the nozzle as the quenching gas. The collected silicon carbide powder contained less than 6% free carbon and less than 9% oxygen and had a surface area >100 m$^2$/g. Over a one hour run time 950 grams of powder were harvested. The percentage of carbon and oxygen were varied by controlling the feed composition, feed rate, feed material, and other reactor variables. This example illustrated that fine powders, and more specifically nanoscale powders, of carbon doped carbides and interstitial alloys can be manufactured. Such powders are needed in abrasives and structural products markets. Additional applications of high purity carbide powders include, but are not limited to, structural, electronic, electromagnetic, device, thermal, catalytic, photonic, optical, electrochemical, chemical, films/coatings, sensor, instrumentation, sputtering and biomedical applications.

EXAMPLE 6

Iron/Iron Oxide

Iron salt of mixed napthenic acids and carboxylic acid was pumped into the plasma reactor with argon as in Example 1. Nitrogen and argon gases were added at the entrance and at the exit to the nozzle as the quenching gas. Based on x-ray diffraction analysis, the major phase of the collected powder was iron with a minor amount of iron oxide (FeO). The powder had a surface area of 19 m$^2$/g and mean size of 40 nm. By using oxygen in place of argon and nitrogen, $Fe_2O_3$ and $Fe_3O_4$ was produced by using different nozzle with narrow opening (rapid quench), $Fe_3O_4$ was produced with surface area of 26 m$^2$/gm and a mean size of 43 nm. Using a nozzle with a larger opening (slower quench), $Fe_2O_3$ was produced with surface area of 16 m$^2$/gm and a mean size of 72 nm.

This example again illustrated that metallic powders from organic precursors may be produced using high temperature process. Furthermore, the example illustrated that fine powders, and more specifically nanoscale powders, of nanocomposites and magnetic materials (Fe/FeO) can be manufactured. The example also illustrates the flexibility of producing different compositions by utilizing changes in the gas environment and the reactor component design. Applications of high purity composite powders are, but are not limited to, structural, electronic, electromagnetic, device, thermal, catalytic, photonic, optical, electrochemical, chemical, films/coatings, sensor, instrumentation, sputtering and biomedical applications.

EXAMPLE 7

Yttrium Oxide

Yttrium octoate was pumped into the plasma reactor with oxygen as in Example 1. Oxygen was used as the quenching gas. The yttrium oxide powder produced had a surface area greater than 39 $m^2/g$ and mean size of less than 30 nm. Fine powder such as yttria can be used at low concentrations in ceramic compositions used in the multilayer ceramic capacitor industry where it is desirable to uniformly disperse this additive (or dopant) material through out the bulk ceramic composition.

EXAMPLE 8

Multimetal Oxides

Multimetal precursors as identified in Table 1 were mixed and then pumped into the plasma reactor with oxygen as in Example 1. As a non-limiting example, $BaZrO_3$ was produced by mixing the precursor for barium and zirconium in appropriate stoichiometric ratio which then was fed into the reactor. Oxygen was used as the quenching gas. Table 2 presents the compositions produced and their observed characteristics. Fine powder such as multimetal oxides (titanates, zirconates, silicates, manganates, ferrites, doped ceria) can be used as dopants and additives in the single layer and multilayer electroceramic and magnetoceramic components industry where it is desirable to uniformly disperse this additive (or dopant) material through out the bulk ceramic composition. Multimetal compositions are also useful in batteries, fuel cells, catalysts, biomedical implants, sintering aids, sputtering targets, thermal, and optical applications.

TABLE 1

| Desired Composition | Precursor |
|---|---|
| Barium | Barium Carboxylate (OMG PLASTISTAB 2116) |
| Zirconium | Zirconium 2-ethylhexanoate (SHEPHARD Zr VERSALATE 1394) |
| Aluminum | Aluminum organic complex (OMG 7% AOC) |
| Calcium | Calcium dimethylhexanoate (SHEPHARD Ca Versalate 1424) |
| Silicon | Octamethylcyclotetrasiloxane (GELEST S106700.0) |
| Cerium | Cerium 2-ethylhexanoate (OMG 12% Cerium Hex-Cem 1024) |
| Titanium | Tetrakis (2-ethylhexyl) titanate (DUPONT TYZOR TOT) |

TABLE 2

| Composition | Surface Area ($m^2/gm$) | Particle Size (nm) | Particle Size (nm, XRD Scherrer Analysis) |
|---|---|---|---|
| $BaZrO_3$ | >30 | | <30 |
| $BaTiO_3$ | >20 | <50 | |
| $CaZrO_3$ | >15 | <75 | <65 |
| $CaTiO_3$ | >20 | <70 | |
| $CeO_2$ | >50 | <20 | <20 |
| $Al_2O_3.SiO_2$ | >15 | <150 | <75 |

USES

High purity fine powders have numerous applications in industries such as, but not limited to, biomedical, pharmaceuticals, sensor, electronic, telecom, optics, electrical, photonic, thermal, piezo, magnetic, catalytic and electrochemical products. For example, biomedical implants and surgical tools can benefit from higher purity powders. Powdered drug carriers and inhalation particulates that reduce side effects benefit from purer powders. Sputtering targets for electronic quality films and device fabrication offer improved performance and reliability with higher purities. Such sputtering targets can be prepared from fine powders using isostatic pressing, hot pressing, sintering, tape casting, or any other technique that yields high density compact. Optical films prepared from higher purity powders offer more consistent refractive index and optical performance. Passive components such as capacitors, inductors, resistors, thermistors, and varistors offer higher reliability if powder purity is more reliable. Electrochemical capacitors prepared from higher purity powders offer higher charge densities, high volumetric efficiencies, and longer mean times between failures. Batteries prepared from higher purity powders offer longer shelf life, longer operational times, more capacity, and significantly superior performance. Chemical sensors prepared from higher purity powder be more selective and sensitive. Catalytic materials that are prepared from purer powders last longer and give superior selectivity. Magnetic devices prepared from purer powders are expected to offer superior magnetic performance. Purer powder based composites are expected to be more corrosion resistant. In general, purer powders offer a means of improving the value-added performance of existing products that are produced from less pure powders.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A nanoscale powder with purity greater than 99.9% by metal basis and comprising silicon carbide, wherein the powder comprises of particles with mean size less than 250 nanometers.

2. The powder of claim 1, wherein the purity is greater than 99.999%.

3. The powder of claim 1 wherein the powder comprises particles having a mean size less than 100 nanometers.

4. A product prepared using the powder of claim 1.

* * * * *

UNITED STATES PATENT AND TRADEMARK OFFICE
CERTIFICATE OF CORRECTION

PATENT NO. : 6,569,397 B1 Page 1 of 1
DATED : May 27, 2003
INVENTOR(S) : Yadav et al.

It is certified that error appears in the above-identified patent and that said Letters Patent is hereby corrected as shown below:

Column 3,
Line 15, "100", should read -- $10^\circ$ --.

Signed and Sealed this

Seventh Day of October, 2003

JAMES E. ROGAN
*Director of the United States Patent and Trademark Office*